United States Patent
Hsu (10) Patent No.: US 7,508,396 B2
(45) Date of Patent: Mar. 24, 2009

(54) REGISTER-COLLECTING MECHANISM, METHOD FOR PERFORMING THE SAME AND PIXEL PROCESSING SYSTEM EMPLOYING THE SAME

(75) Inventor: R-Ming Hsu, Jhudong Township, Hsinchu County (TW)

(73) Assignee: Silicon Integrated Systems Corp., Hsin-Chu (TW)

( * ) Notice: Subject to any disclaimer, the term of this patent is extended or adjusted under 35 U.S.C. 154(b) by 561 days.

(21) Appl. No.: 11/237,512

(22) Filed: Sep. 28, 2005

(65) Prior Publication Data

US 2007/0070075 A1    Mar. 29, 2007

(51) Int. Cl.
*G06T 15/00* (2006.01)

(52) U.S. Cl. .................. 345/559; 345/501; 712/217

(58) Field of Classification Search ............ 345/559, 345/501, 506; 712/217, 218, 221, 222
See application file for complete search history.

(56) References Cited

U.S. PATENT DOCUMENTS

| | | | |
|---|---|---|---|
| 5,493,669 A | 2/1996 | Denman | |
| 5,652,774 A | 7/1997 | Eickermeyer et al. | ....... 712/217 |
| 5,872,950 A | 2/1999 | Levitan et al. | |
| 6,028,613 A | 2/2000 | Larson | |
| 6,061,785 A | 5/2000 | Chiarot et al. | |
| 6,240,509 B1 | 5/2001 | Akkary | |
| 6,314,511 B2 | 11/2001 | Levy et al. | .................. 712/217 |
| 6,950,928 B2 | 9/2005 | Ronen et al. | |
| 7,015,913 B1 * | 3/2006 | Lindholm et al. | ........... 345/501 |
| 7,085,914 B1 | 8/2006 | Gschwind | |
| 2005/0027968 A1 | 2/2005 | Rupley et al. | |
| 2005/0251654 A1 | 11/2005 | Altman et al. | |
| 2007/0030277 A1 * | 2/2007 | Prokopenko et al. | ........ 345/506 |

FOREIGN PATENT DOCUMENTS

| | | |
|---|---|---|
| EP | 0614138 | 9/1994 |
| JP | 11296371 | 10/1999 |
| TW | 494300 | 7/2002 |
| TW | 200527283 | 8/2005 |

* cited by examiner

*Primary Examiner*—Phu K Nguyen (57) ABSTRACT

A pixel processing system includes a register-collecting mechanism and a pixel shader. The register-collecting mechanism corrects a first program to a second program. The first program requires a number of first registers. The second program requires a portion of the first registers of the first program. The pixel shader executes the second program. A method for register-collecting mechanism comprises the steps of: scanning the first instructions of the first program; decoding the first instructions to obtaining a plurality of first register numbers of busy register group of the first program; correcting the first program to a second program which only occupies the busy register group. As a result, the idle register group of the first program is available to be reallocated to the additional piled in pixels. Thus the pixel processing system can process more pixels in a batch using a given number of registers, and longer texture load latency can be hidden.

30 Claims, 11 Drawing Sheets

REGISTER-COLLECTING MECHANISM, METHOD FOR PERFORMING THE SAME AND PIXEL PROCESSING SYSTEM EMPLOYING THE SAME

BACKGROUND OF THE INVENTION

1. Filed of the Invention

The present invention relates to a register-collecting mechanism, a method for performing the register-collecting mechanism and a pixel processing system employing the register-collecting mechanism, and more particularly to a register-collecting mechanism, a method for performing the register-collecting mechanism and a pixel processing system employing the register-collecting mechanism used in a three dimensional graphic processor unit (GPU).

2. Description of the Prior Art

Figure 1:
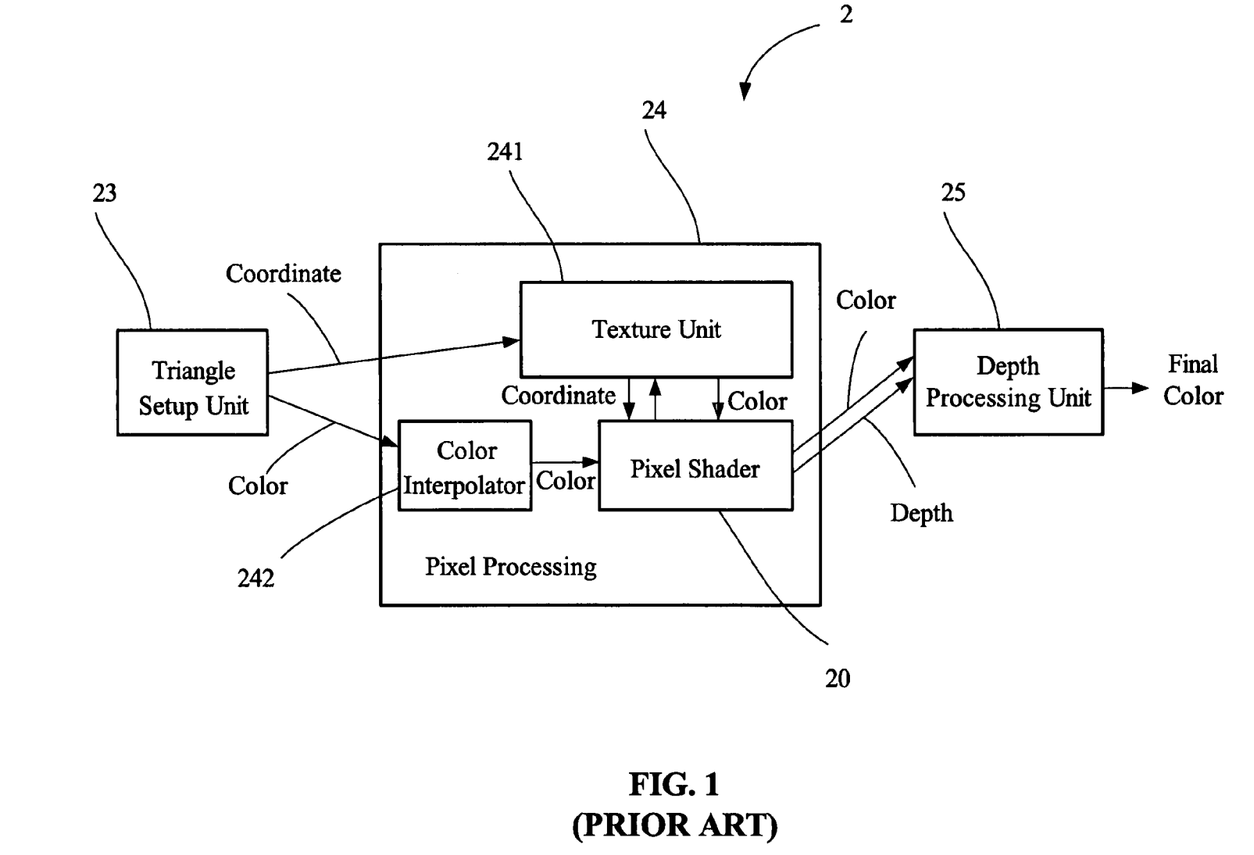
FIG. 1 is a block diagram illustrating a pipeline configuration of a conventional graphic processor unit which is popularly used in nowadays.

Referring to FIG. 1, a conventional graphic processor unit 2 mainly comprises a triangle setup unit 23, a pixel processing unit 24 and a depth processing unit 25. The pixel processing unit 24 comprises a pixel shader 20, a texture unit 241 and a color interpolator 242 both connecting a pixel shader 20.

A surface of three-dimensional (3D) object is divided into a plurality of triangles two-dimensionally arranged in terms of their neighboring relationship and having an arbitrary size. The triangles each comprise three vertices. The vertices are forwarded to the triangle setup unit 23. The triangle setup unit 23 outputs the parameters of the pixels, such as the positions of the pixels in triangles and texture coordinates of the vertices of the corresponding triangles, to the pixel processing unit 24. In the pixel processing unit 24, based on the positions of the pixels and texture coordinates of the vertices, the texture unit 241 interpolates the texture coordinates for all the pixels. The interpolated texture coordinates of the pixels are input and then processed in the pixel shader 20 (with DirectX terms, or Fragment Processor in OpenGL terms). Next, the pixel shader 20 executes a texture load instruction, such as a texld instruction of DirecX, to return the processed texture coordinates to the texture unit 241. Based on the unprocessed texture coordinates and the processed texture coordinates, the texture unit 241 samples the texture colors of the pixels in a texture map and outputs the texture colors to the pixel shader 20. Meanwhile, based on the positions of the pixels and texture coordinates of the vertices, the color interpolator 242 interpolates the vertex colors for all the pixels and outputs the vertex colors of the pixels to the pixel shader 20. The pixel shader 20 processes the texture colors and the vertex colors of the pixels and outputs color value and depth value of the pixels to the depth processing unit 25, the final pixel colors are obtained. The final pixel colors are then available for drawing whole frame.

Figure 2:
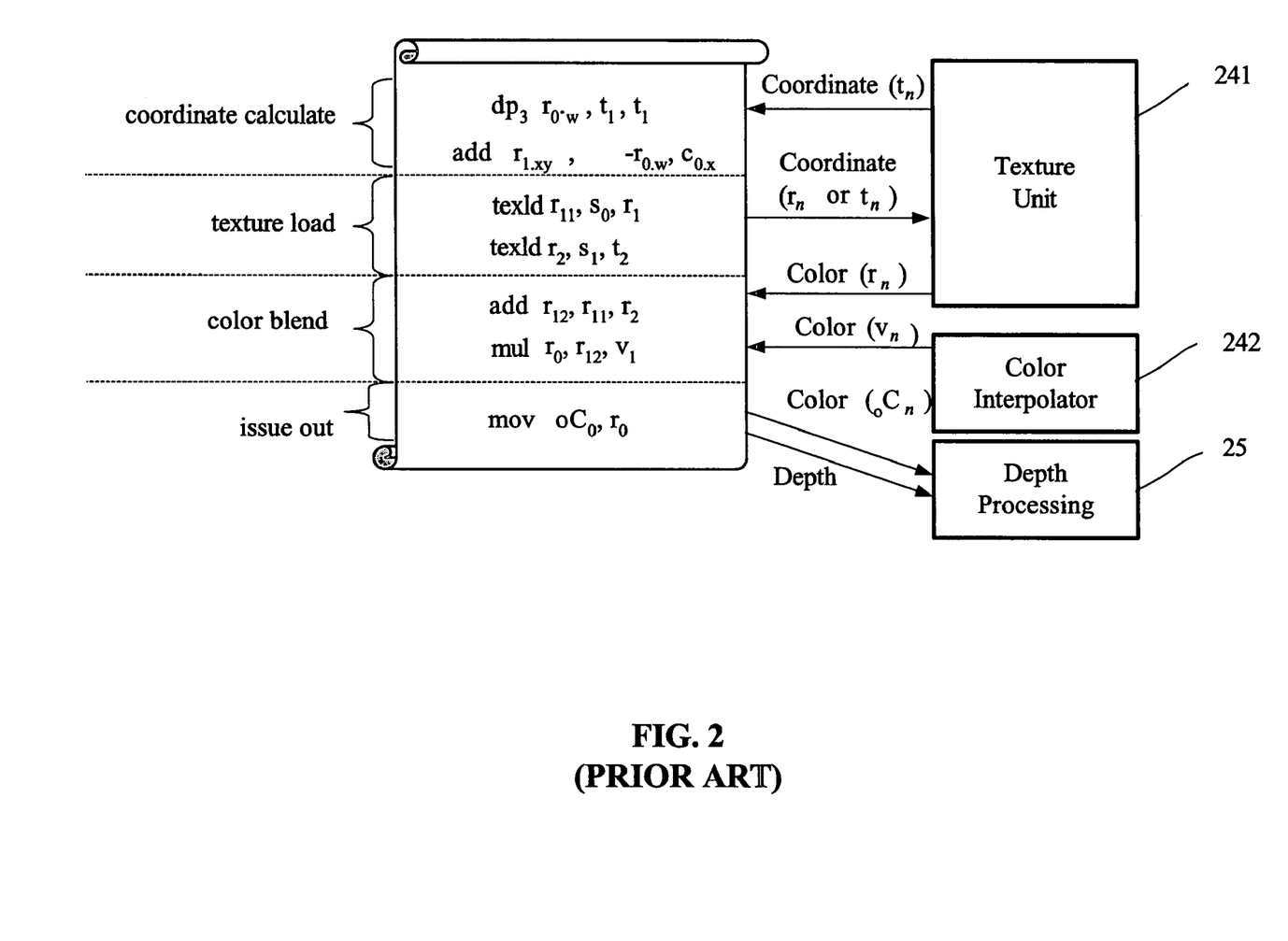
FIG. 2 is a block diagram illustrating processing of an exampled program in a pixel shader of the conventional graphic processor shown in FIG. 1.

Referring to FIG. 2, the pixel shader 20 usually comprises four kinds of registers: temporary registers $r_n$ for storing temporary data, texture coordinates registers $t_n$, textures numbering registers $s_n$, vertex color registers $v_n$, and outputting registers $_oc_n$ for transforming the final pixel colors to the depth processing unit 25.

The process of the pixel shader 20 normally comprises four stages: a coordinate calculation stage, a texture processing stage, a color blending stage and an issue out stage. The interpolated texture coordinates of the pixels from the texture unit 241 are stored in the texture coordinates registers $t_n$. In the coordinate calculation stage, the arithmetic, for the interpolated texture coordinates of the pixels from the texture unit 241, is conducted in the texture coordinates registers $t_n$ and the temporary registers $r_n$, the arithmetic results, i.e. the processed texture coordinates, are stored in the temporary registers $r_n$. In the texture processing stage, based on the texture coordinates in the registers $t_n$ and $r_n$, the pixel shader 20 executes texture load instructions to require the texture unit 241 to sample texture colors of the pixels in a texture map. The texture map is appointed by the textures numbering registers $s_n$. The sampled texture colors are transformed to the temporary registers $r_n$. In the color blending stage, the pixel shader 20 blends the texture colors stored in the temporary registers $r_n$ with the vertex colors from the color interpolator 242 and the blending result is stored in the vertex color registers $v_n$. In the issue out stage, the pixel shader 20 outputs color values and depth values of the pixels to the depth processing unit 25. It should be noted that the coordinate calculation stage, the texture processing stage and the color blending stage may be repetitiously processed or be omitted, respectively.

It is well known a second instruction usually has data dependency upon a first instruction and that execution of the first and second instructions during the same cycle is not possible. That is, when the second instruction uses the result of the first instruction, it can be executed only after the first instruction is completed. In pixel shader program, the execution latency of the texture load instruction is extremely long because it will involve several times of address transfers, memory accesses and color interpolations. And such a long latency becomes the most critical performance problem. To hiding such long latency, N pixels can be batch executed though the pipeline. If N can be equal or large than the latency multiplied by the pipeline throughput, the following instruction can be executed with no stall. However, the full register sets of the executed N pixels have to be temporarily stored in N register sets to wait for execution of the instructions. Therefore, the pixel shader 20 in the conventional GPU 2 is required to provide additional registers for temporarily storing the executed pixels. And the cost of the additional registers is so large that N never enough to hiding the long texture load latency.

To solve the above-mentioned problem, U.S. Pat. No. 5,652,774 discloses a central processing unit (CPU) having a rename register file comprising a plurality of rename registers to reduce the number of cycles required to execute instructions. The data processing method of the CPU includes a step of loading, in response to executing a first load instruction, data into the rename register file from a cache. The method further includes the steps of executing a second load register having a source register, and determining, during the execution of the subsequent instruction, that the requested data reside in a rename register of the rename register file. The method also includes the step of substituting the source register with the rename register containing the requested data. The rename register file has typically been used for allowing the conventional CPU to execute instructions in non-sequential fashion, thereby reducing the cycle times of the subsequent instructions. However, the CPU generally maintains the association between the rename register and the second subsequent instruction for a longer period. The rename register cannot be timely freed to execute a new instruction. Therefore, the conventional CPU causes a substantial increase in the number of the registers. Furthermore, reading/writing data from/into the cache also results in a long latency.

To solve the above-mentioned problem, U.S. Pat. No. 6,314,511 discloses an improved processor with a rename register file which comprises a plurality of rename registers. The processor employs an indicator to timely free a rename register from association with an old instruction, so the rename register is available to execute another instruction. However, processor is combined with the complicated outof-order register-renaming mechanisms. In other words, after instructions are fetched and then decoded, the register-renaming mechanism is dynamically performed to rename the registers to index re-order buffers that only appear in out-of-order mechanisms. Therefore, the register-renaming mechanism for the out-of-order processing processor is more complicated than for the in-order processing processors.

Hence, an improved pixel processing system is desired to overcome the above-mentioned shortcomings.

BRIEF SUMMARY OF THE INVENTION

One object of the present invention is to provide a pixel processing system employing a register-collecting mechanism which is capable of processing more pixels in a batch using a given number of registers. Thus longer texture load latency can be hidden.

Another object of the present invention is to provide a method for collecting registers allocated to a pixel shader program so that the pixel processing system processes more pixels in a batch. Thus longer texture load latency can be hidden.

The pixel processing system in accordance with the present invention comprises a register-collecting mechanism and a pixel shader coupled to the register-collecting mechanism. The register-collecting mechanism corrects a first program to a second program. The first program requires a plurality of first registers. The second program requires a portion of the first registers of the first program. The pixel shader fetches and executes the second program and reallocats the portion of the registers of the first program to the second program.

A method is provided for collecting the registers allocated to a first program in the pixel processing system. The first program comprises a plurality of first instructions and requires a plurality of first registers. The first registers comprise a busy register group and an idle register group. The busy register group comprises the first registers which are presented in the first instructions for implementing the first program. The idle register group comprises the first registers which are idle in executing the first program. The method comprises the steps of: scanning the first instructions of the first program; decoding the first instructions to obtaining a plurality of first register numbers of the busy register group; correcting the first program to a second program having a plurality of second instructions. The second program only occupies the busy register group, so the idle register group of the first program is available to be reallocated to other program.

The method further comprises providing physical register numbers mapped to register numbers of the busy registers, and modifying each register number to corresponding physical register number. The physical register numbers are continuous integral and are sequentially numbered.

The method further comprises a step of issuing the amount indicator of the physical register numbers to the pixel processing system.

The method further comprising reporting the total number of the pixels which are processed in the pixel processing system.

If the pixels comprise several groups of pixels and the groups of pixels each comprises different number of pixels. The method further comprises reporting which group is processed in the pixel processing system.

Because of the register-collecting mechanism, the pixel processing system of the present invention is capable of executing more pixels using a given number of registers. The method of the present invention modifies the first program to the second program, thereby collecting and reducing the number of registers required by the first program.

Other objects, advantages and novel features of the invention will become more apparent from the following detailed description when taken in conjunction with the accompanying drawings.

DETAILED DESCRIPTION OF THE INVENTION

Figure 3:
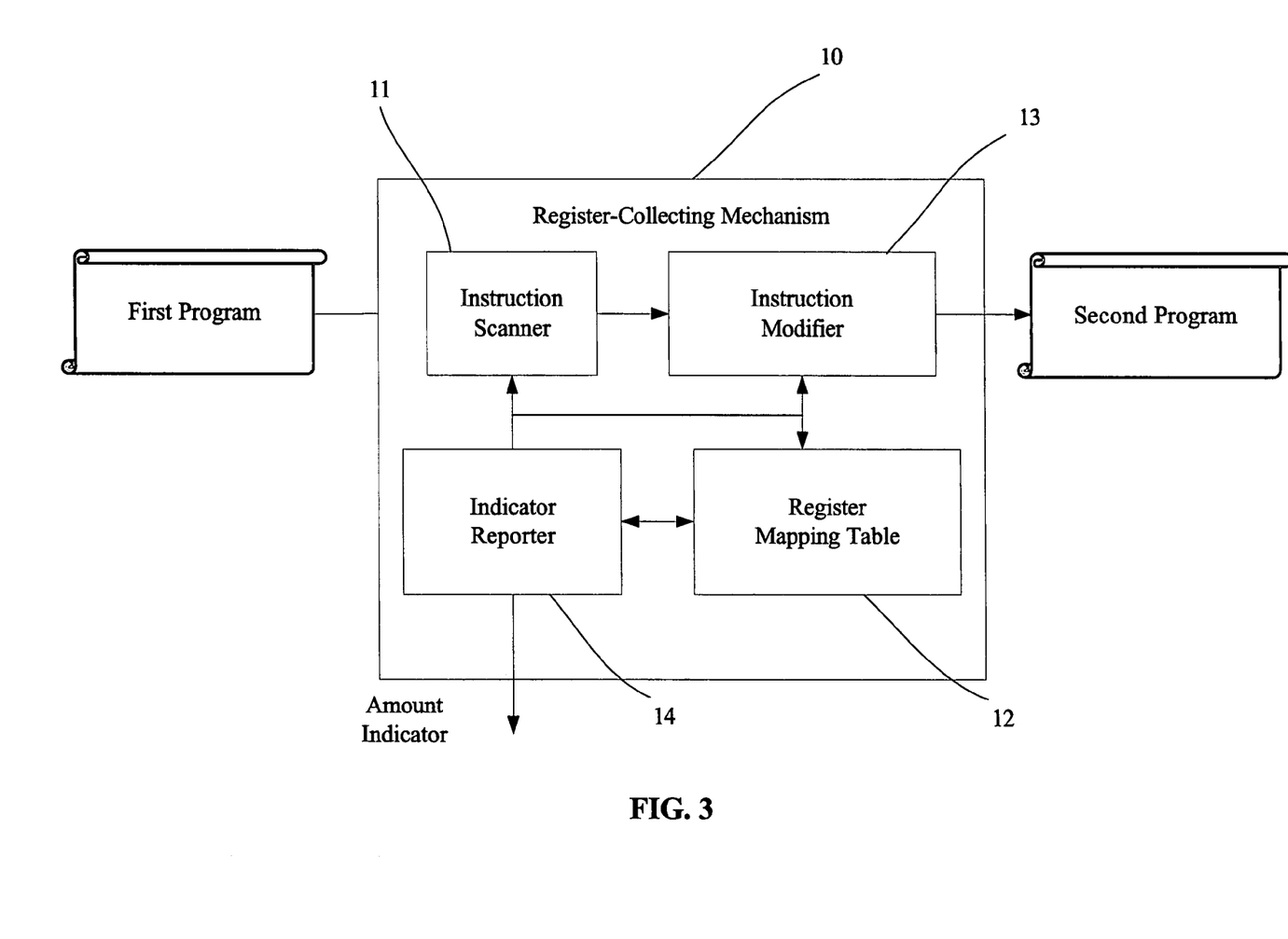
FIG. 3 is a block diagram of a register-collecting mechanism according to the present invention.
Figure 4A:
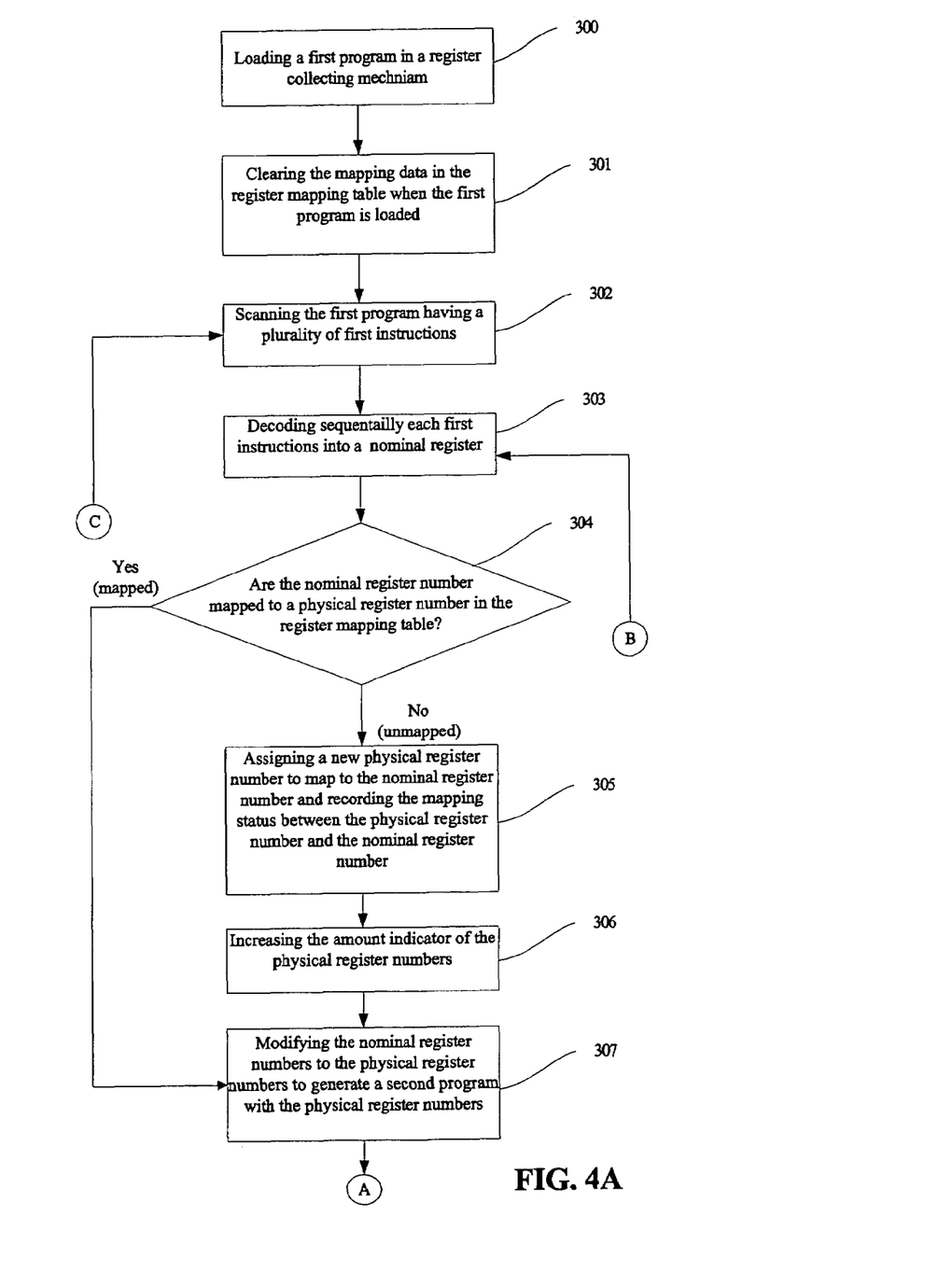
FIGS. 4A and 4B is a flow chart illustrating the processing of a first method for performing the register-collecting mechanism of the present invention.

Referring to FIG. 3, a register-collecting mechanism 10 of the present invention is provided, before fetching or decoding a first program, for modifying the first program to a second program which requires less registers than the first program. The first program comprises a plurality of first instructions and requires a plurality of nominal registers. However, only some of the nominal registers are presented in instructions of the first program. Actually, the nominal registers presented in the instructions of the first program are used for implementing the first program. The rest of the nominal registers are idle but occupied by the first program. For example, a first program shown in FIG. 4 nominally requires 16 registers. However, it is clear that four nominal registers r0, r1, r3 and r15 are presented in the instructions of the first program and are used for implementing the first program. The rest nominal registers r2 and r4 to r14 are idle and aren't used for the first program. The register-collecting mechanism 10 collects these idle nominal registers of the first program so that the idle nominal registers of the first program are efficiently utilized and can be available to be reallocated to other program.

The register-collecting mechanism 10 according to the present invention comprises an instruction scanner 11, a register mapping table 12, an instruction modifier 13 and an indicator reporter 14.

The instruction scanner 11 scans and decodes the first instructions of the first program, thereby extracting a plurality of nominal register numbers from the first instructions. The register mapping table 12 is coupled to the instruction scanner 11 and comprises a plurality of physical register numbers stored therein for mapping to the nominal register numbers of the first program. The instruction modifier 13 is coupled to the instruction scanner 11 and the register mapping table 12 and is provided for modifying the nominal register numbers to the corresponding physical register numbers, thereby generating a second program. The indicator reporter 14 reports the amount indicator of the physical register numbers.

Figure 4B:
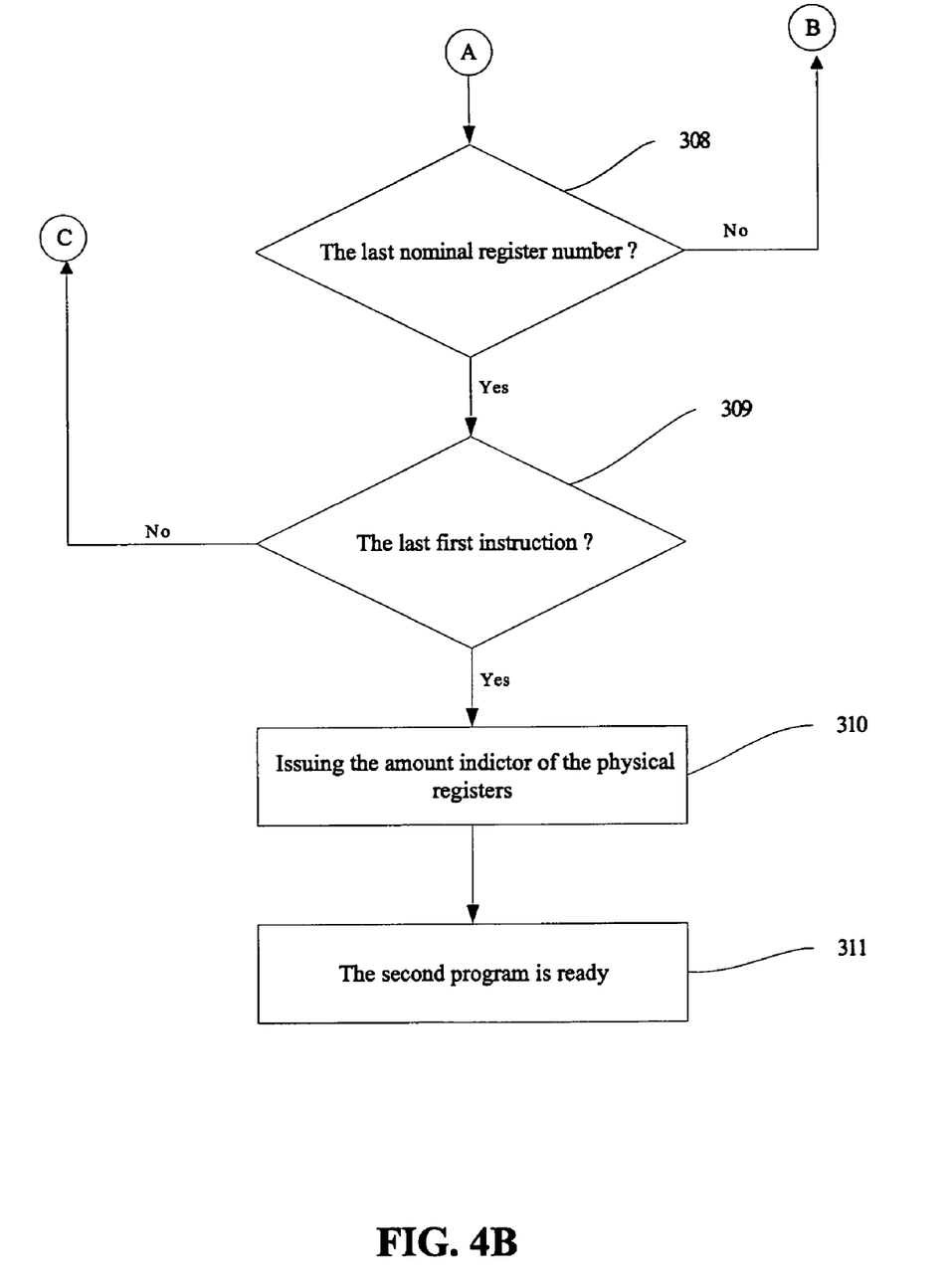

Referring to FIG. 4, a first method for performing register-collecting mechanism 10 according to the present invention is shown. Beginning at step 300, the first program is inputted into the register-collecting mechanism 10 and is loaded to run. Thereafter, in step 301, the related mapping data are cleared from the register mapping table 12 to initially reset the mapping status regarding the previous nominal and physical register numbers. In step 302, the first program having a plurality of first instructions is statically scanned by the instruction scanner 11 in order from top to bottom. In step 302, the instruction scanner 11 scans sequentially every first instruction of the first program according to a sequence of the first instructions positioned in the first program. Next, step 303 proceeds to decode the scanned first instruction to sequentially obtain a plurality of nominal register numbers. The step 303 is also conducted in the instruction scanner 11. Then, decision step 304 proceeds to determine whether a nominal register number is mapped to a physical register number in the register mapping table 12. If the determination at the decision step 304 is negative, i.e. one of the nominal register numbers is unmapped to any physical register number previously stored in the register mapping table 12, a physical register number is newly added to the register mapping table 12 for mapping to the nominal register number in step 305. In the step 305, the mapping status or matched relationship between the nominal register number and physical register number is recorded in the register mapping table 12. It should be noted that, according to mapping sequence, the physical register numbers are continuous integral and are ordinarily and ascendingly numbered from 0 to n or from 1 to n. Finally, step 306 of sequentially increasing the amount indicator of the physical register numbers in response to the mapping status is performed. If the determination at the decision step 304 is positive, i.e. mapped, the nominal register number is modified to the physical register number to generate a second program having a plurality of second instructions, as shown in step 307. In is clear that the nominal register number is modified to one of the existing physical register numbers with a sequential order. The second program is composed of the physical register numbers and preferably stored in the register mapping table 12.

Thereafter, the method proceeds to step 308 for determining whether the nominal register number is the last nominal register number of the first instruction. If, at step 308, the nominal register number isn't the last nominal register number of the instruction, the step 303 is proceeded again to extract the next nominal register number of the same instruction. When every nominal register number is processed and the nominal register number is determined to be the last register number at step 308, the step 309 is proceeded to for determining that the instruction is the last instruction. At step 300, if the instruction isn't the last instruction of the first program, the step 302 is returned to statically scan the next instruction of the first program. When every instruction is processed, the instruction is determined to be the last instruction of the PS program at step 39. As shown in step 310, the indicator reporter 14 issues the amount indicator of the physical register numbers. The last one of the sequential physical register numbers represents the amount indicator of physical registers number allocated to the second program and is lesser than that of the nominal register number of the first program.

Figure 5:
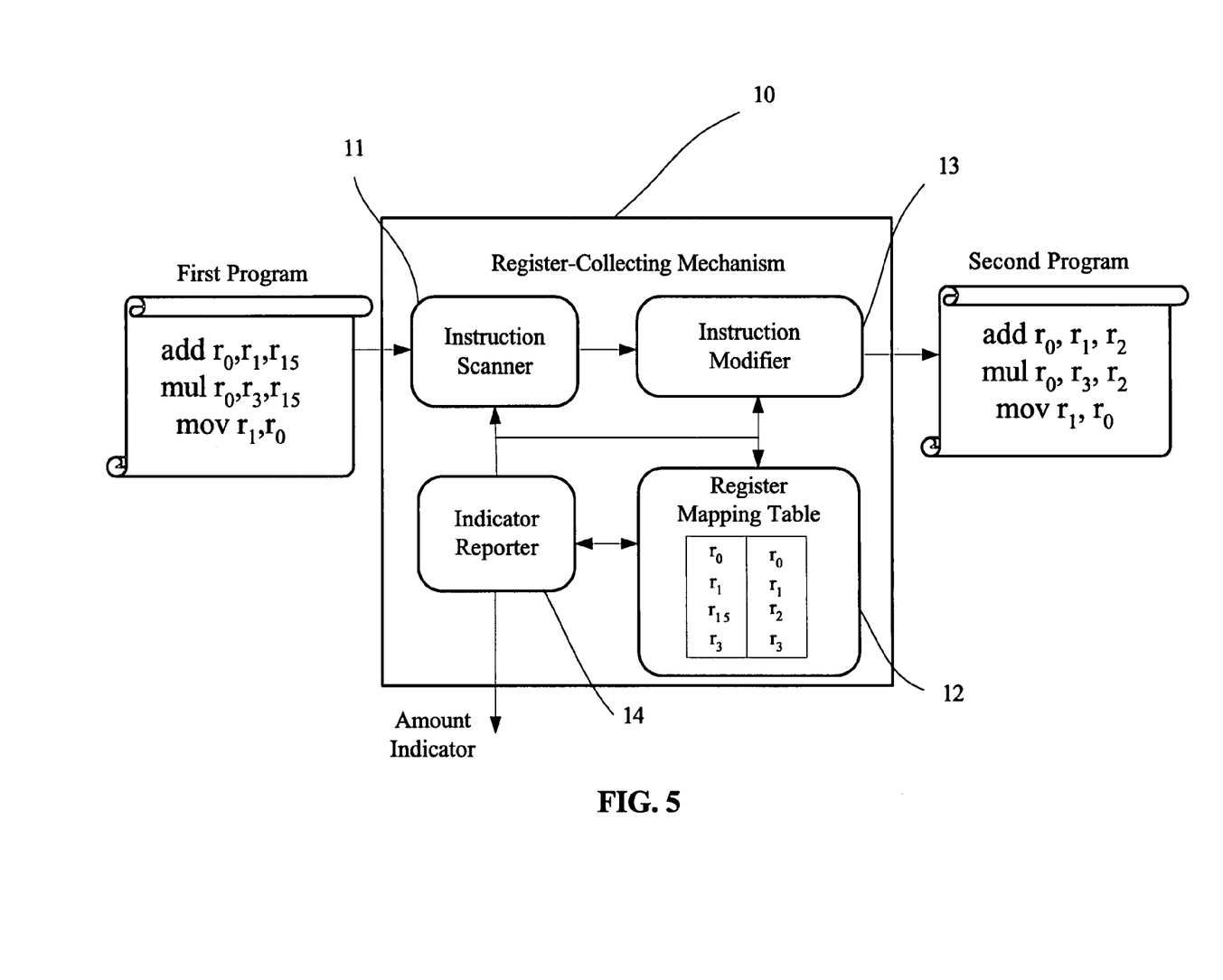
FIG. 5 is a block diagram of the register-collecting mechanism, showing an exampled first program implemented by the first method showing in FIG. 4.

As shown in FIG. 5, an exampled first program is processed by the register-collecting mechanism 10 according to the method shown in FIG. 4. In the example, the instructions of the first program requires 16 registers with nominal register numbers r0~r15. The nominal register numbers presented in the instructions of the first programs is listed in the left-hand column of the register mapping table 12. The physical register number is in the right-hand column of the register mapping table 12. It is clear that the registers r2 and r4 to r14 are idle in execution of the first program.

The first program is loaded in the register-collecting mechanism 10 at step 300. The register mapping table 12 and indicator is cleared at step 301. The first instruction "add r0, r1, r15" of the first program is firstly scanned at step 302. The first instruction is decoded and the nominal register number r0 is obtained at step 303. Since the register mapping table 12 and indicator is cleared at step 301, the nominal register number is determined unmapped to the physical register number of the register mapping table 12 at step 304 and the method proceeds to step 305. At step 305, a physical register number r0 is assigned to map to the nominal register number r0 and the mapping status is recorded to the register mapping table 12. At step 306, the amount indicator 1 of the physical register number then adds 1 and waits for the next mapping. At step 307, the nominal register number r0 is modified to the mapped physical register number r0. Thereafter, at step 307, the nominal register number r0 isn't the last register number of the first instruction, the method goes back to the step 303 to decode the next nominal register number r1 of the first instruction. The nominal register number r1 is modified to a mapped physical register number r1 and the amount indicator is added to 2.

When the nominal register number r15 is processed, a physical register number r2 is provided to map to the third register number r15 at step 305. At step 307, the nominal register number r15 is modified to the mapped physical register number r2. At step 308, the nominal register number r15 is the last register number of the first instruction. At step 308, the first instruction isn't the last instruction of the first program, the method goes back to proceed to step 302 to process the next instruction of the first program. When the instruction "mov r1, r0" is processed and then is determined to be the last instruction of the first program at step 309, the method proceeds to the step 310. At step 310, the indicator reporter 14 reports an amount indicator 4. Finally, a second program is ready to run. In this example, the first program originally requires 16 nominal registers.

Being processed by the register-collecting mechanism 10, the first program is modified to the second program which requires only 4 registers of the first program, and the rest of the registers of the first program are available to be reallocated to process other program.

Instead of sequentially decoding, all the nominal register numbers of a first instruction may be simultaneously decoded at step 303. For example, all of the nominal register numbers r0, r1 and r15 of an instruction of the first program shown in FIG. 4 may be decoded simultaneously at step 303. As a result, the method goes back to the step 304 other than goes back to the step 303 if the nominal register number r0 isn't the last nominal register number of the instruction at step 308.

Figure 6A:
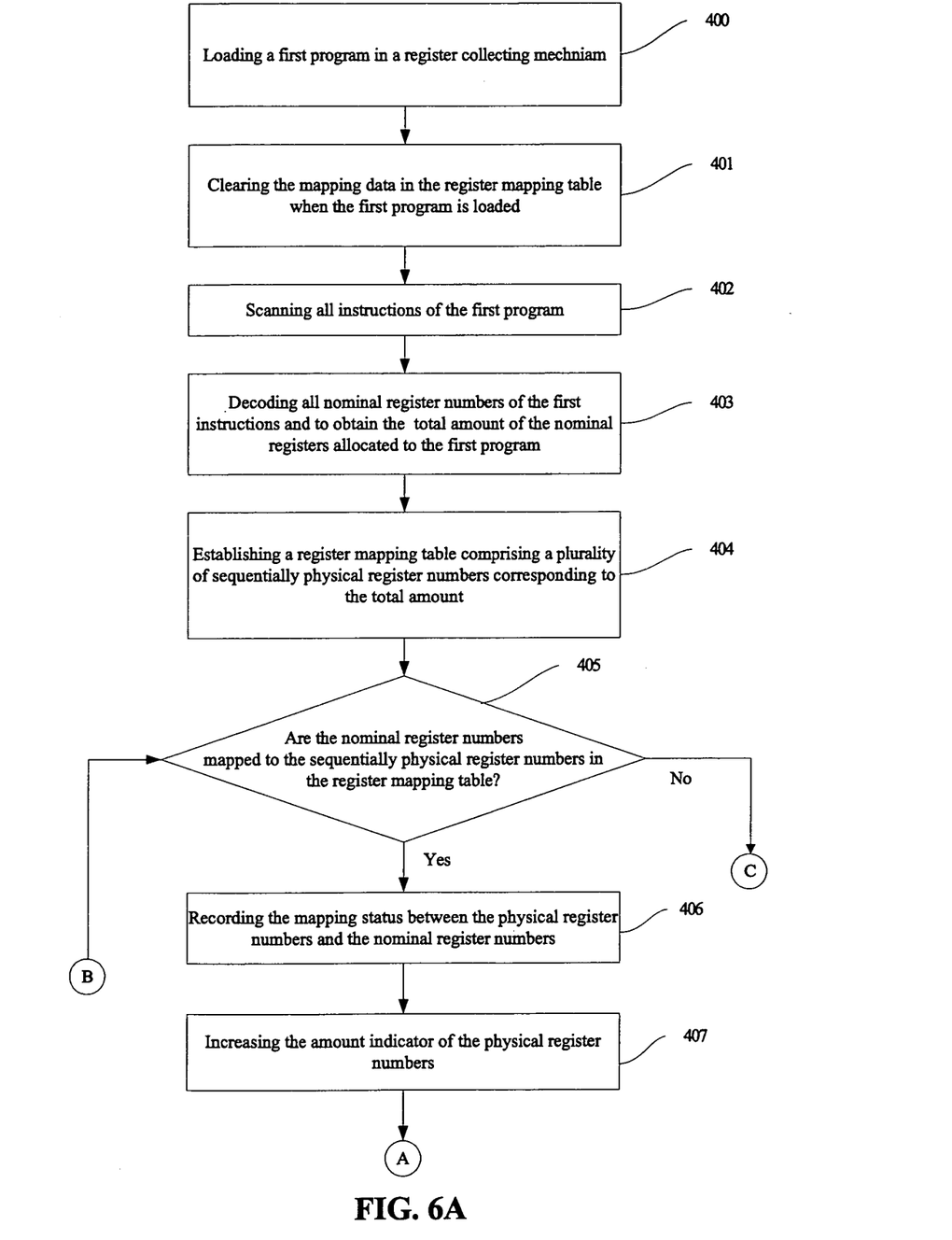
FIGS. 6A and 6B is a flow chart illustrating the processing of a second method for performing the register-collecting mechanism of the present invention.
Figure 6B:
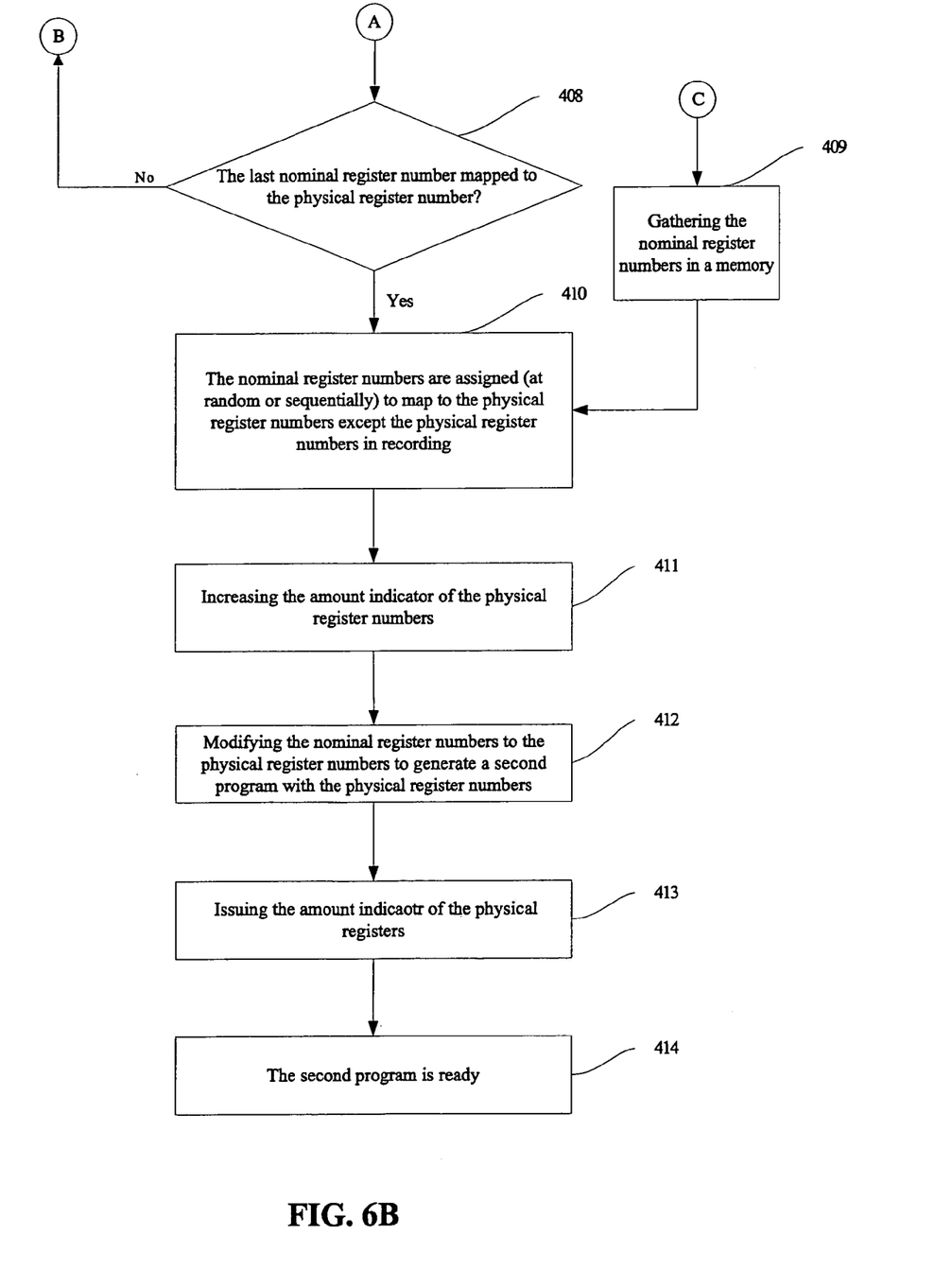

Referring to FIG. 6, a second method for performing register-collecting mechanism 10 according to the present invention is shown. Beginning at step 400, the first program having a plurality of first instructions is inputted into the register-collecting mechanism 10 and is loaded to run. Thereafter, in step 401, the related mapping data are cleared from the register mapping table 12 to initially reset the mapping status regarding the previous nominal and physical register numbers. In step 402, all of the first instructions of the first program are scanned. Next, step 403 proceeds to decode the scanned instructions to obtain all of nominal register numbers of the instructions and the total amount of the nominal registers allocated to the first program. In step 404, a register mapping table 12 is established. The register mapping table 12 comprises a plurality of sequentially physical register numbers corresponding to the total amount of step 403. Then, step 405 proceeds to determine whether the nominal register numbers of instructions each are mapped to respective physical register numbers stored in the register mapping table 12. If the determination at the step 405 is positive, i.e. mapped, step 406 proceeds to record the mapping status between the physical register number and the nominal register number. Then an amount indicator of the physical register numbers is increased in step 407. The step 408 proceeds to determine whether the nominal register number is the last nominal register number mapped to the physical register number in the register mapping table 12. If the determination at the step 408 is negative, i.e. the nominal register number is not the last nominal register number mapped to the physical register number in the register mapping table 12, the step 405 is proceeded again.

If the determination at the step 405 is negative, i.e. unmapped, the step 409 is proceeded for gathering and temporarily storing in the unmapped nominal register numbers in a memory of the register-collecting mechanism 10. If the determination at the step 408 is positive, i.e. the nominal register number is the last one mapped to the physical register number, step 401 proceeds. At the step 410, the stored nominal register numbers in the memory of the register-collecting mechanism 10 are assigned, at random or sequentially, to map to the physical register numbers, except the physical register numbers which are recorded mapped to the nominal register numbers. Then step 411 proceeds for increasing the amount indicator of the physical register numbers. Next, the nominal register numbers are modified to the physical register numbers to generate a second program with the physical register numbers at step 412. The amount indicator of the physical registers is issued at step 413. The second program then is ready at step 414.

Figure 7:
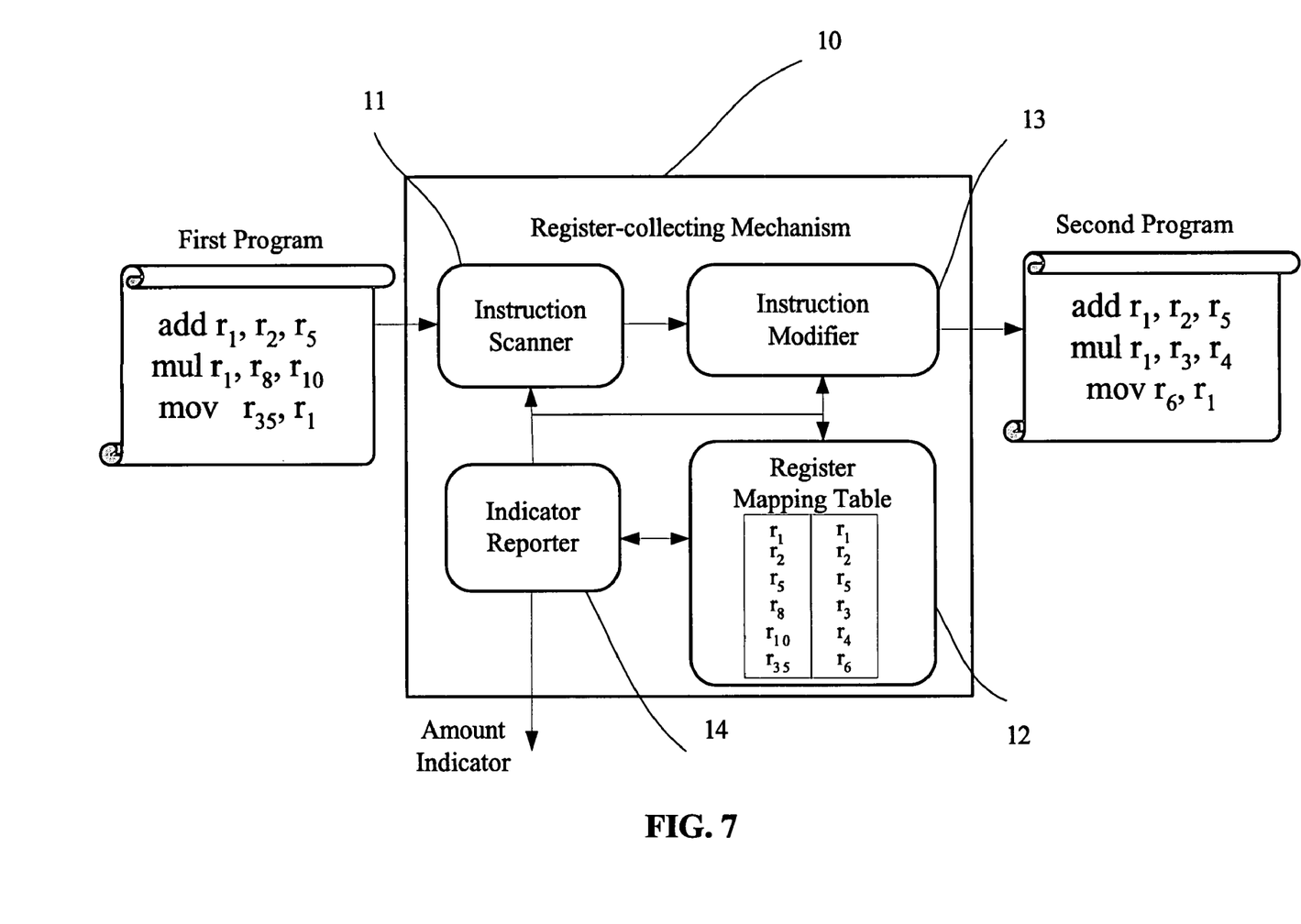
FIG. 7 is a block diagram of the register-collecting mechanism, showing an exampled first program implemented by the second method showing in FIG. 6.

Referring to FIG. 7, an exampled first program is processed by the register-collecting mechanism 10 according to the second method shown in FIG. 6. In the example, the instructions of the first program requires 35 registers with nominal register numbers r1~r35. The nominal register numbers presented in the instructions of the first programs is listed in the left-hand column of the register mapping table 12. The physical register number is in the right-hand column of the register mapping table 12.

Being processed by the register-collecting mechanism 10, the first program is modified to the second program which requires only 6 registers of the first program, and the rest of the nominal registers of the first program are available to be reallocated to other program.

Beginning at step 400, the first program having a plurality of first instructions is inputted into the register-collecting mechanism 10 and is loaded to run. Thereafter, in step 401, the related mapping data are cleared from the register mapping table 12. In step 402, all of the first instructions of the first program are scanned. Next, step 403 proceeds for decoding the scanned instructions to obtain all of nominal register numbers of the instructions and the total amount 6 of the nominal registers allocated to the first program. In step 404, a register mapping table 12 is established. Corresponding to the total amount 6, the register mapping table 12 comprises six sequentially physical register numbers numbered from 1 to 6. Then at step 405, the nominal register number r1 is mapped to a physical register number r1 stored in the register mapping table 12. The step 406 proceeds to record the mapping status between the physical register number r1 and the nominal register number r1. Then an amount indicator of the physical register numbers is increased to 1 in step 407. At step 408, the nominal register number r1 is not the last nominal register number mapped to the physical register number in the register mapping table 12 and the step 405 is proceeded again. Then the nominal register numbers r2 and r5 are respectively mapped to physical register numbers r2 and r5 stored in the register mapping table 12. At the step 408, the nominal register number r15 is the last one mapped to the physical register number.

At the step 405, the nominal register numbers r8, r10 and r35 are determined unmapped to the physical register numbers in the register mapping table 12, the step 409 is proceeded for gathering and temporarily storing in the unmapped nominal register numbers r8, r10 and r35 in a memory of the register-collecting mechanism 10. If At the step 408, the nominal register number r15 is the last one mapped to the physical register number, step 410 is proceeded. At the step 410, the stored nominal register numbers r8, r10 and r35 are assigned, at random or sequentially, to map to the physical register numbers r8, r10 and r35 respectively, except the recorded physical register numbers r1, r2 and r5. Then step 411 proceeds to increase the amount indicator of the physical register numbers to 6 according the mapping status. Next, the nominal register numbers are modified to the physical register numbers to generate a second program with the physical register numbers at step 412. The amount indicator of the physical registers 6 is issued at step 413. The second program then is ready at step 414.

It should be noted that the register-collecting mechanism 10 can be implemented in form of software or hardware. Being software, the register-collecting mechanism 10 is a software tool kit running in an operating system (OS), a program loader or a part of a device driver attached to a latter part of a compiler. Furthermore, in view of hardware, the register-collecting mechanism 10 is preferably connected to an instruction fetch unit or a decode unit, i.e. before the instruction queue unit 201 and decoder 203 of the pixel shader 20 in the preferred embodiment, or may be built in a pixel shader. The register-collecting mechanism 10 makes physical registers available for more pixels since the first programs are statically scanned to regenerate the simplified second programs by the register-collecting mechanism.

Figure 8:
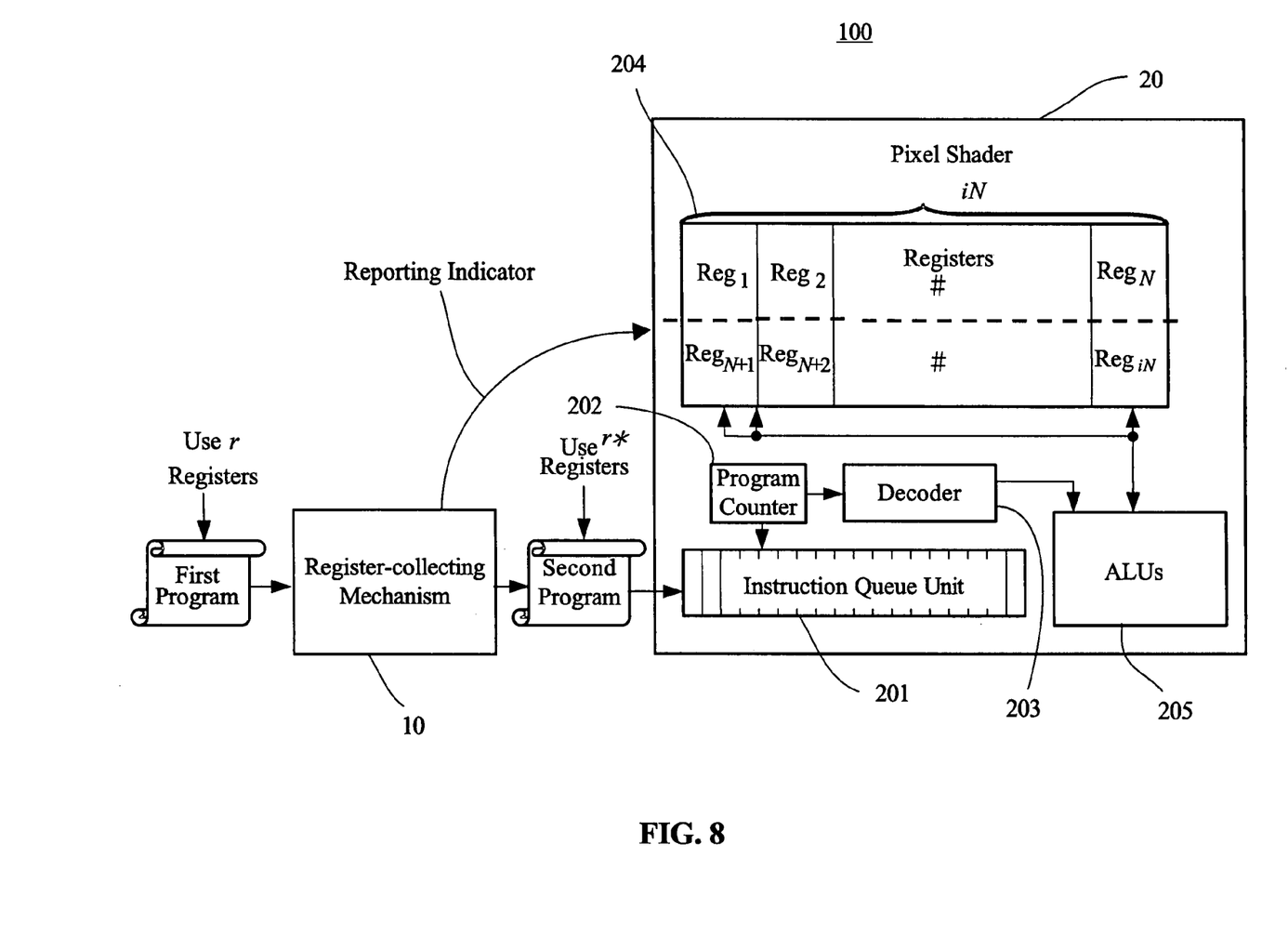
FIG. 8 is a block diagram illustrating a pipeline configuration of the pixel processing system employing the register-collecting mechanism.

Referring to FIG. 8, a register-collecting mechanism 10 of the present invention is employed by a pixel processing system 100. The register-collecting mechanism 10 modifies the first program to the second program and collects and reduces the nominal registers allocated to the first program, whereby the pixel processing system 100 is capable of process more pixels using given number of physical registers. The pixel processing system 100 is used in a graphic processing unit (GPU) and comprises a pixel shader 20 connected with the register-collecting mechanism 10. The pixel shader 20 typically comprises an instruction queue unit 201, a program counter 202, a decoder 203, a plurality of registers 204, and an arithmetic logic unit (ALU) 205. The instruction queue unit 201 receives the second program from the register-collecting mechanism 10. The program counter 202 fetches the instructions of the second program from the instruction queue unit 201. The fetched instructions are decoded by the decoder 203.

The ALUs 205 controls the execution of the decoded instructions. The indicator reporter 14 of the register-collecting mechanism 10 reports the amount indicator of the physical registers of the second program to the pixel shader 20 so that the pixel processing system 100 is capable of determining the number of the idle nominal registers of the first program to be reassigned to other programs according to the amount indicator. In other words, the pixel processing system 100 implements the instructions of the second program at a minimum number of physical registers, thereby saving more nominal registers to process other programs.

Before the first program is input into register-collecting mechanism 10, the number of nominal registers allocated to the first program is defined as "r". On other hand, after the first program is modified to a second program by the register-collecting mechanism 10, the total amount of physical registers allocated to the second program is defined as "r'" (r'<r). The ratio "i" of r to r' (i=r/r') indicates the utilization status of the physical registers assigned to the first and second programs, where "i" is a positive number and preferably natural number. If executing a first program, the pixel shader 20 can process N pixels, the pixel processing system 100 of the present invention is capable of process simultaneously iN pixels after the collection of the register-collecting mechanism 10.

Figure 9:
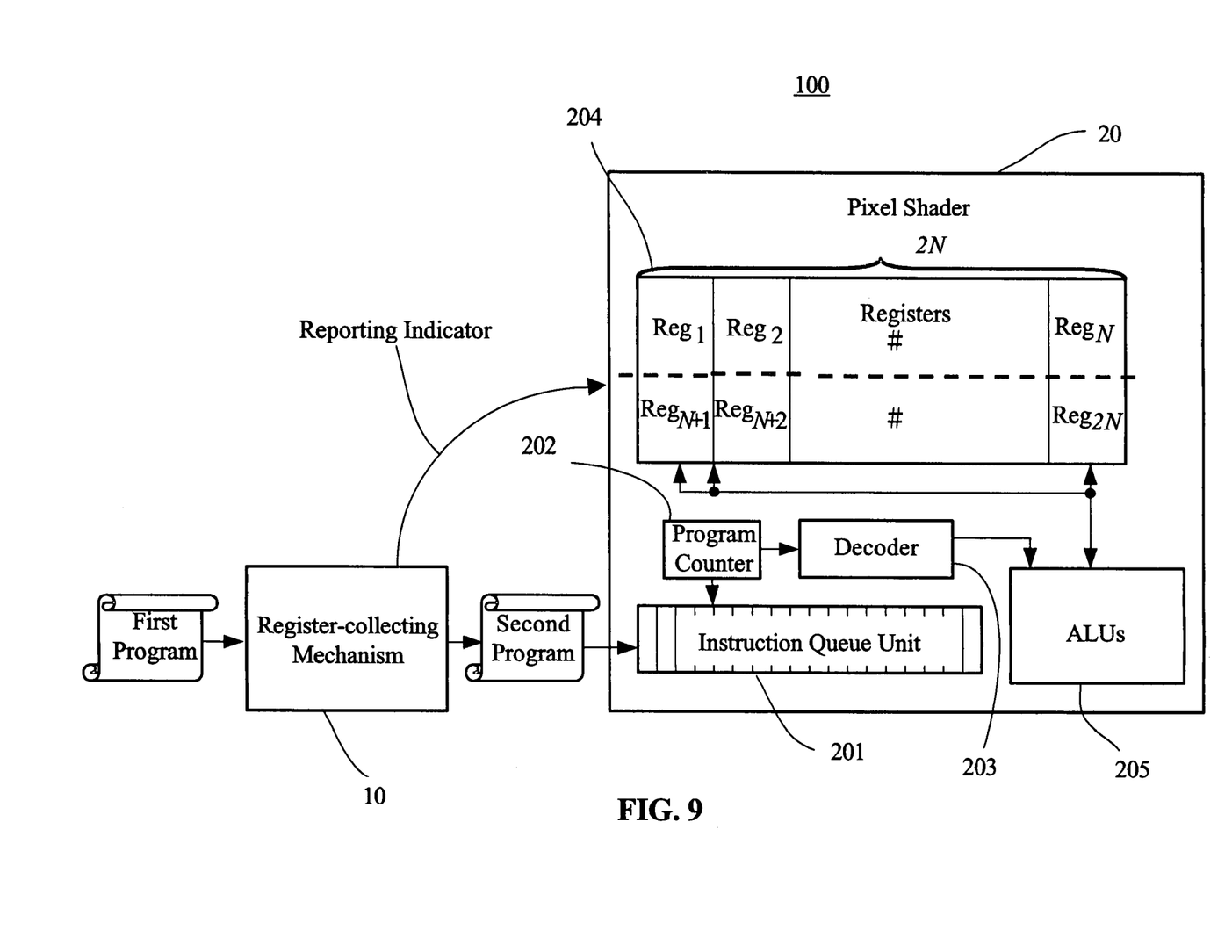
FIG. 9 is similar to FIG. 8, illustrating a pipeline configuration of the pixel processing system employing the register-collecting mechanism.

Referring to FIG. 9, in an example, it is assumed that, without the register-collecting mechanism 10, the pixel shader 20 executes a first program to process. N pixels using a certain number of registers. The register-collecting mechanism 10 modifies the first program to a second program. If the second program requires only half of the physical registers of the first program, the other half of the registers are available to be reallocated to process N pixels. Therefore, the pixel processing system 100 of the present invention is capable of processing 2N pixels.

It should be noted that the indicator issued from the indicator reporter 14 to the pixel shader 20 may indicate the number of the physical registers required by the second program or the total number of the pixels which can be processed in the pixel processing system 100. If the pixels processed in the pixel processing system 100 of present invention comprises several groups of pixels and the groups of pixels each comprise different number of pixels, the indicator may also indicate which group of pixels is processed in the pixel processing system 100.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A pixel processing system comprising:
a register-collecting mechanism, modifying a first program which requires a plurality of first registers to a second program which requires a portion of the first registers of the first program for collecting the rest of the registers originally allocated to the first program; and
a pixel shader coupled to the register-collecting mechanism, fetching the second program for executing the second program and reallocating the collected rest of the first registers of the first program to be available to other program, wherein the register-collecting mechanism collects the rest of the first registers in advance before the pixel shader executes the second program having the portion of the first registers therein.

2. The pixel processing system according to claim 1, wherein the pixel shader comprises an instruction memory for storing the second program.

3. The pixel processing system according to claim 1, wherein the first program comprises a plurality of first instructions having a portion of the nominal registers.

4. The pixel processing system according to claim 3, wherein the register-collecting mechanism comprises an instruction scanner scanning the first instructions of the first program.

5. The pixel processing system according to claim 4, wherein the instruction scanner sequentially scans the first instructions by a series of static positions in the first program.

6. The pixel processing system according to claim 4, wherein the instruction scanner simultaneously scans the first instructions by a series of static positions in the first program.

7. The pixel processing system according to claim 1, wherein the register-collecting mechanism comprises:
an instruction scanner, scanning and decoding a first program having a plurality of first instructions to obtain a plurality of first register numbers of the first program;
a register mapping table coupled to the instruction scanner, comprising a plurality of second register numbers corresponding to the first register numbers; and
an instruction modifier coupled to the instruction scanner and the register mapping table, modifying the first register numbers to corresponding second register numbers to generate at least one second program having a plurality of second instructions which are composed of the second register numbers in the register mapping table.

8. The pixel processing system of claim 7, wherein the first register numbers in the first instructions of the first program are a plurality of nominal register numbers allocated to the first program.

9. The pixel processing system of claim 8, wherein the second register numbers are corresponding to a plurality of physical register numbers allocated to the second programs.

10. The pixel processing system of claim 9, wherein the second register numbers in the register mapping table are a plurality of sequential numbers.

11. The pixel processing system of claim 10, further comprising an indicator reporter to issue an amount indicator of the second registers allocated to the second program.

12. The pixel processing system of claim 11, wherein the last one of sequential second register numbers is corresponding to the amount indicator of the second registers allocated to the second program and is corresponding to total number of the first register numbers presented in the first instructions of the first program.

13. The pixel processing system of claim 11, wherein the amount indicator is the total amount of the second registers allocated to the second program.

14. The pixel processing system according to claim 11, wherein the indicator reporter reports the total number of the pixels processed in the pixel processing system.

15. The pixel processing system according to claim 7, wherein the register-collecting mechanism is one selecting from a group consisting of a software tool kit running in an operating system, a program loader, and a part of a device driver attached to a latter part of a compiler.

16. A method for performing a register-collecting mechanism in a pixel processing system, the method comprising the steps of:
loading a first program comprising a plurality of first instructions in the register-collecting mechanism;

scanning at least one of the first instructions of the first program;

decoding at least one of the first instructions into at least one first register number;

mapping at least one first register number to a second register number in a register mapping table; and modifying the first program for reallocating a portion of the first registers of the first program to generate a second program having a plurality of second instructions and collecting the rest of the first registers originally allocated to the first program to be available to other program in a pixel shader, wherein the second program has at least one second register number in the register mapping table and the register-collecting mechanism collects the rest of the first registers in advance before the pixel shader executes the second program.

17. The method according to claim 16, further comprising a step of clearing the register mapping table before scanning at least one of the first instructions of the first program.

18. The method according to claim 16, further comprising a step of determining whether the first register number is mapped to the second register number previously stored in the register mapping table.

19. The method according to claim 18, wherein the first instructions of the first program are sequentially scanned by a series of static positions in the first program during the step of scanning at least one of the first instructions of the first program.

20. The method according to claim 18, further comprising a step of generating the first register numbers during the step of decoding the first instructions of the first program.

21. The method according to claim 20, wherein the total amount of the first registers allocated to the first program is obtained during the step of decoding the first instructions of the first program.

22. The method according to claim 21, further comprising a step of establishing the register mapping table comprising a plurality of second register numbers corresponding to the total amount of the first registers.

23. The method according to claim 21, further comprising a step of gathering the first register numbers in a memory of the register mapping table if the first register numbers unmapped to the second register numbers.

24. The method according to claim 23, further comprising a step of assigning the first register numbers in the memory to map to the second register numbers in the register mapping table except the second register numbers which have mapped to the first register numbers.

25. The method according to claim 16, further comprising a step of assigning a new second register number to the second register number when the first register number is unmapped to the second register number previously stored in the register mapping table.

26. The method according to claim 25, wherein the mapping status between the first register number and the second register number is recorded in the register mapping table during the step of assigning the new second register number to the second register number.

27. The method according to claim 26, wherein a plurality of physical register numbers mapped to the second register numbers are continuous positive integers and are ordinarily and ascendingly numbered.

28. The method according to claim 27, where the last one of the second register numbers represents the amount indicator of second registers number allocated to the second program.

29. The method according to claim 28, further comprising a step of issuing the amount indicator of the second register numbers to the pixel shader.

30. The method according to claim 16, further comprising reporting the total number of the pixels processed in the pixel processing system.

* * * * *